United States Patent [19]

Gramss

[11] Patent Number: 4,893,700

[45] Date of Patent: Jan. 16, 1990

[54] DAMPING DEVICE, IN PARTICULAR FOR OPERATING MEMBERS IN AUTOMOTIVE VEHICLES

[75] Inventor: Rainer Gramss, Norderstedt, Fed. Rep. of Germany

[73] Assignee: ITW-ATECO, GmbH, Norderstedt, Fed. Rep. of Germany

[21] Appl. No.: 196,283

[22] Filed: May 20, 1988

[30] Foreign Application Priority Data

Jun. 4, 1987 [DE] Fed. Rep. of Germany ... 8707936[U]

[51] Int. Cl.⁴ .............................. F16F 9/14; E05F 3/04
[52] U.S. Cl. ......................................... 188/306; 92/121
[58] Field of Search .............. 188/306, 307, 308, 309, 188/310; 92/121, 122; 192/58 A

[56] References Cited

U.S. PATENT DOCUMENTS

| | | | |
|---|---|---|---|
| 1,873,100 | 8/1932 | Allen | 188/310 |
| 3,269,737 | 8/1966 | Freese | 92/121 |
| 3,915,073 | 10/1975 | Burda | 92/121 |

FOREIGN PATENT DOCUMENTS

| | | | |
|---|---|---|---|
| 2102457 | 8/1972 | Fed. Rep. of Germany | 188/309 |
| 1298763 | 6/1962 | France | 92/121 |
| 0082813 | 5/1935 | Sweden | 188/89 |
| 0918640 | 4/1982 | U.S.S.R. | 188/309 |
| 0472836 | 9/1937 | United Kingdom | 188/307 |

*Primary Examiner*—Douglas O. Butler
*Assistant Examiner*—Mark T. Le
*Attorney, Agent, or Firm*—Schwartz & Weinrieb

[57] ABSTRACT

A damping device, in particular for operating members within motor vehicles comprises a housing including a chamber, a liquid phase medium within the chamber, a shaft extending through the chamber, at least one radial vane attached to the shaft in such a manner that when pivoting the vane in the direction of one of two circumferentially spaced radial stops, the medium displaced out of one chamber portion will flow into the other chamber portion through means of a flow constriction, either the housing or the shaft being stationary and the housing or the shaft being connected with the actuating member, whereby at least one throughbore is defined within the vane and serves as the flow constriction.

11 Claims, 1 Drawing Sheet

DAMPING DEVICE, IN PARTICULAR FOR OPERATING MEMBERS IN AUTOMOTIVE VEHICLES

FIELD OF THE INVENTION

The present invention relates to a damping device, and in particular to a damping device for operating members in automotive vehicles.

BACKGROUND OF THE INVENTION

Numerous operating members written in automotive vehicles, such as, for example, door lock actuator's, lids for glove compartments, lids for ash-trays, and the like are actuated by means of springs. Door lock actuators for example are retracted into their normal inoperative position by means of springs. Lids of glove compartments are moved into their opened position by means of a spring after a manual release operation. The course of motion caused by means of the spring comes to a sudden stop as a result of engagement with an abutment. Therefore, a more or less intensive noise is generated. Therefore, it is known to provide respective braking or damping devices which slow down the motion of the operating member and enable a more or less slowed down approach to the end stop.

It is known from German disclosure 33 16 756 in this connection to accommodate a liquid medium and a vane within a sealed chamber of a housing, the vane being attached to a shaft. The vane defines a sector in cross section thus providing a circular arc contour at its circumference which is adapted to the circular arc contour of the chamber. Between the vane and the chamber wall a radial gap is provided. Furthermore, a radial gap is provided between an inner rib within the chamber and the shaft for the vane. Such a braking device consists of relatively few single parts, however, and therefore the manufacture thereof is expensive. In order to define an accurate gap, a precise machining operation is necessary or otherwise jamming of the vane may occur. Furthermore, a relatively high amount of material is required. Finally it is difficult with the prior art braking device is adapt it to different braking conditions. It extensively depends upon the size of the spring and the operating member upon which the braking effect is desired.

OBJECT OF THE INVENTION

Therefore, it is the object of the invention to provide a damping device in particular for operating members within automotive vehicles which is of simple design and can easily be adapted to various braking conditions.

SUMMARY OF THE INVENTION

The foregoing and other objects are achieved by means of a damping device constructed in accordance with the present invention.

In the damping device according to the invention at least one throughbore is defined within the vane. Therefore, the vane can be shaped very simply, for example, to have a plate-type configuration. Preferably, the outer surface of the vane associated with the chamber wall is arranged at a small distance from the chamber wall, the gap formed thereby also defining a passage for the fluid medium, however, the throughbore within the vane being primarily responsible for the braking effect. The cross section thereof defines the volume flow per time unit and thus, the braking effect desired. Depending upon the degree of the desired braking effect, the effective area of the throughbore is more or less large or, alternatively throughbores are selected, respectively, which can be easily formed. Therefore, the damping device according to the invention can very easily be adapted to different braking conditions.

In view of the fact that with the braking device according to the invention no defined gaps are required, the manufacture of the damping device according to the invention is extraordinarily simple. Also the mass of material is relatively low.

The vane is preferably formed of plastic material as a single piece with the shaft. Also the housing is preferably manufactured of plastic material. According to an embodiment of the invention, the surface opposite to the chamber comprises an inner contour which is adapted to the curvature of the shaft.

The medium within the chamber is to be prevented from leaking outwardly. Therefore, respective seals are required. One embodiment of the invention provides for the shaft having a radial flange which is accommodated by means of a corresponding recess defined within the housing, and an annular seal accommodated within a circumferential portion of the flange. According to a further embodiment of the invention, at the opposite end of the device, a second recess is defined within the housing so as to extend at least partially around the circumference of the housing for accommodating a closure locking ring connected with the shaft, the ring accommodating an annular seal within a circumferential portion thereof. The ring may be welded to the shaft. Alternatively, it may be axially secured thereto by means of a retaining ring or the like.

BRIEF DESCRIPTION OF THE DRAWINGS

The invention will now be explained in connection with the drawings in which.

DETAILED DESCRIPTION OF THE PREFERRED EMBODIMENT

Figure 1:
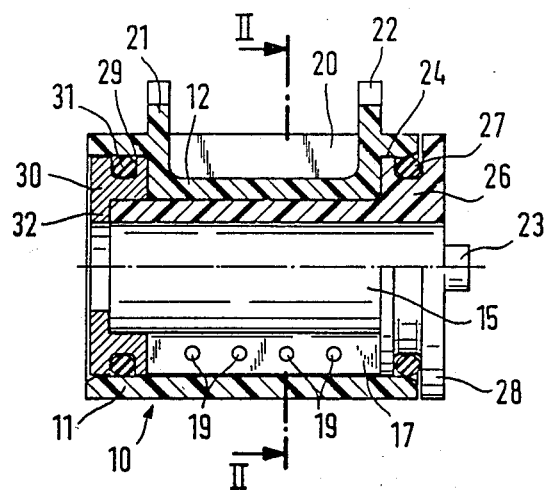
FIG. 1 is a longitudinal cross section of a braking device according to the invention.

Before dealing more closely with the details shown in the drawings, it is stated that each of the features described in itself or in connection with features of the overall invention combination are nevertheless significant to the invention.

Figure 2:
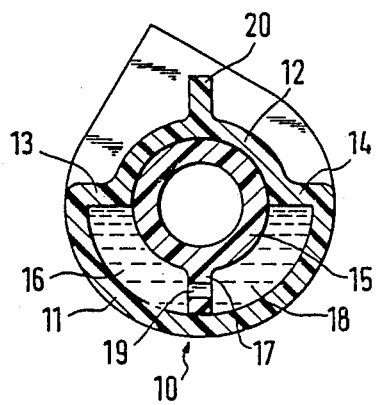
FIG. 2 is a cross section of FIG. 1 along the line II—II.

The housing 10 shown in FIGS. 1 and 2 comprises a semicylindrical portion 11. At the opposite side, a semicylindrical portion 12 is provided having a smaller diameter. Both housing portions 11, 12 are mutually connected by means of radial housing portions 13, 14 which serve as stop members as will become more apparent hereinafter. Within the housing 10, a hollow shaft 15 is supported. The hollow shaft 15 is adapted the inner contour of the housing portion 12 (see FIG. 2). Within the housing 10, a chamber 16 is defined by means of the described housing portion 11, 12, 13, 14, the chamber 16 having a semicircular cross section wherein half of the shaft 15 protrudes thereinto as well as a radial vane 17 integrally formed with to the shaft. The vane 17 is adapted to the contour of the chamber 16 at its radial outer surface, a minimal distance being provided such that either minimal or no friction occurs therebetween. A liquid medium 18 is provided upon both sides of the vane 17 within the chamber 16. Within the vane 17, four throughbores 19 are formed. It can obviously be seen that the housing 10, as well as the shaft 15 and the vane 17, are integrally formed of plastic material. Upon the upper portion of the housing portion 12, a radially outwardly extending rib 20 is formed so as to serve as a connection with a member, that is, to serve as a driving member for torque conversion. The triangularly shaped radially outward extending portions 21, 22 may serve the same purpose. Finally, a torque can also be transferred by the input end 23 of the shaft 15.

A partly circular recess 24 is defined within one end of the housing 10. It accommodates a radial flange or shoulder portion 26 which is integrally formed with the shaft 15 and which accommodates an O-ring 27 within a groove defined within a circumferential portion thereof. A radial flange 28 is arranged adjacent to the shoulder 26 and bears against the front side of the housing 10. At the opposite side or end of the housing, the housing 10 comprises another partly circular recess 29. It accommodates a ring 30 which surrounds the shaft 15 and is provided with an O-ring 31 within a circumferential portion thereof. An inwardly extending radial shoulder 32 bears against the front side of the associated shaft.

Referring now to FIG. 2, the vane 17 divides the chamber 16 into two sections. Upon a relative rotation of the housing 10 and the shaft 15, the medium is displaced from one section to the other section through means of the bores 19. As the bores have a relatively small cross section, an intensive braking operation and thus a slowdown of the course of motion will result.

The device shown is particularly suitable for the transfer of torque generated within operating members within automotive vehicles, that is door actuators, ashtrays, actuation of doors or the like and is advantageous because of its small outer dimensions.

The ring 30 is either welded to the shaft 15 or is secured thereon by means of a retaining ring or the like.

Obviously, many modifications and variations of the present invention are possible in light of the above teachings. It is therefore to be understood that within the scope of the appended claims, the present invention may be practiced otherwise than as specifically described herein.

I claim:

1. A damping device, comprising:
   a housing;
   a chamber defined within said housing;
   a liquid phase medium disposed within said housing chamber;
   a shaft extending through said chamber so as to be relatively pivotable with respect to said housing and said chamber defined therein;
   at least one radial vane secured to said shaft so as to be relatively pivotable therewith with respect to said housing and said housing chamber, and defining first and second chamber sections within said housing within which said liquid phase medium is disposed:
   at least one throughbore defined within said vane so as to permit said liquid phase medium disposed within said first and second chamber sections of said housing to flow between said first and second chamber sections of said housing as said vane is pivotably moved relative to said housing and said first and second chamber sections defined therein during a damping operation;
   a first recess means defined within a first end of said housing;
   an annular support ring disposed within said first recess means of said housing and having a radially inwardly projecting shoulder portion for seating and supporting a first end of said shaft;
   first groove means annularly defined within an outer peripheral surface portion of said annular support ring;
   first O-ring means disposed within said first groove means of said annular support ring so as to be interposed between said annular support ring and said first recess means of said housing for sealing said first end of said housing;
   a second recess means defined within a second end of said housing;
   an annular shoulder portion integrally formed with said shaft for disposition within said second recess means of said housing;
   second groove means annularly defined within an outer peripheral surface portion of said shoulder portion of said shaft; and
   second O-ring means disposed within said second groove means of said shaft shoulder portion so as to be interposed between said shaft shoulder portion and said second recess means of said housing for sealing said second end of said housing.

2. The damping device according to claim 1, characterized in that the vane (17) is plate-like.

3. The damping device according to claim 2, characterized in that the vane (17) and the shaft (15) are made of plastic material in one piece.

4. The damping device according to claim 3, characterized in that the housing (10) comprises an inner contour at the side opposite to the chamber (16), adapted to the curvature of the shaft (15).

5. A damping device as set forth in claim 1, further comprising:
   means provided upon said housing for receiving pivotable torque movements whereby said relative pivotable movements defined between said housing and said shaft are able to be achieved.

6. A damping device as set forth in claim 1, further comprising:
   means provided upon said shaft for receiving pivotable torque movements whereby said relative pivotable movements defined between said housing and said shaft are able to be achieved.

7. A damping device as set forth in claim 1, further comprising:
   radially outwardly projecting flange means integrally formed upon said shoulder portion of said shaft for engaging said second end of said housing.

8. A damping device as set forth in claim 1, wherein: said shoulder portion of said shaft is formed upon a second end portion of said shaft.

9. A damping device as set forth in claim 1, wherein: said housing has a substantially semi-cylindrical configuration.

10. A damping device as set forth in claim 9, wherein: said shaft and said semi-cylindrical housing are coaxially disposed with respect to each other.

11. A damping device as set forth in claim 1, wherein: four throughbores are defined within said vane.

* * * * *